United States Patent Office 3,085,020
Patented Apr. 9, 1963

3,085,020
METHOD OF MAKING A FRENCH FRIED POTATO PRODUCT
George T. Backinger, Albion, and David L. Meggison, Fayetteville, N.Y., assignors to General Foods Corporation, White Plains, N.Y., a corporation of Delaware
No Drawing. Filed Aug. 18, 1960, Ser. No. 50,331
4 Claims. (Cl. 99—207)

This invention relates to a new process for making French fried potatoes from mashed potatoes. The term "French fried" where used throughout the text of the specification refers to products which are deep fat fried. This application is a continuation-in-part of Serial No. 16,943, filed March 23, 1960.

Present methods for the manufacture of French fried potatoes call for peeling, trimming and cutting raw potatoes into slices or strips of suitable size which are then cooked. In the marketing of frozen fried potato products these potato pieces are first cooked in steam or water, and are thereafter fried. The potato pieces are usually fried to a golden brown color and thereafter are cooled, packaged and frozen. The consumer is then expected to reheat the product before serving during which time the golden color of the product deepens to a characteristic fried color.

The present methods of manufacturing French fried potatoes for distribution are limited by a number of factors which contribute to cost and impose quality limitations on the product. To explain, whole potatoes will vary in solids and sugar content in accordance with the maturity of the potato, the temperature of storage, the variety of potato, and the growing conditions. In addition, in each potato the solids and sugar content of the skin portion and the interior portion of the potato vary. Such variations are reflected in the texture and color of the French fried pieces manufactured. Such variations can be partially compensated for by controlling storage conditions as well as processing conditions such as the length of the cook, temperature, size of slice or piece, controlled restoration of sugar level after sugar reduction in blanching, frying temperatures and frying times. However, any one or all of these steps represents only a partial control of the sugar and solids variation and the effect thereof on texture and color of the fried product.

By reason of the shape of the potato, not all of the raw potato can be utilized and in practice it is found that approximately 40% of the raw potato by weight is considered suitable for French frying where the piece is in the shape of a stick or strip of substantial elongation. Usually about 20–30% by weight of the raw potato consists of slivers and short pieces which are either discarded or sent to other manufacturing plants for conversion into starch or other less profitable by-products. The necessity for this practice increases the cost of production of the French fried stick. Further, all potato harvests have a goodly percentage of small potatoes unsuitable for French fries; here also such small potatoes are only useful in starch manufacture or other less profitable lines. Hence, the French fried potato manufacturer is restricted to a certain size of potato which costs usually at least twice as much as the small potatoes.

An object of the present invention is to provide a process whereby a French fried potato product can be produced which has essentially no color or texture variation. Another object of the present invention is to provide a process which is not greatly dependent upon such variations in solids and sugar levels and such processing conditions as are mentioned hereinabove. Another object of the invention is to provide a process which is not dependent upon size or shape of the raw potato but rather may be carried out in producing French fried potato sticks in any desired shape and size regardless of the shape and size of the raw potato. Another object of the invention is to provide a process which meets the foregoing needs in a practical and inexpensive manner such that cost of manufacture is not increased over normal French fried potato production.

It has now been discovered that the objects of the present invention may be met by mixing a cellulose methyl ether, hereinafter referred to as methyl cellulose with cooked potatoes, adjusting the temperature of the mixture to a temperature below 70° F. but above 32° F., shaping the mixture into pieces having smooth surfaces and French frying such pieces.

According to one embodiment of the present invention, raw potatoes irrespective of solids and sugar variations, shape and size are peeled, trimmed and cut into suitable strips, dices or slices and cooked, which cooking can be either a conventional steam blanching or water blanching or combinations of these techniques as well as blanching followed by sugar restoration, all of which are well-known to those skilled-in-the-art.

These raw potato pieces should be cooked to an extent to permit the potato piece to be mashed effectively; this condition generally will occur when the starch of the piece has been gelatinized to a point whereat upon mashing a sticky "runny" liquid consistency will not result. Preferably the potato piece should be cooked to the extent that it will have lumps upon mashing although it is contemplated within the spirit of the present invention that the piece may be cooked to the extent that potatoes are completely cooked in producing mashed potatoes for conventional uses as such. It has been noted that the flavor of the less than wholly cooked potato pieces, that is, pieces which are lumpy upon being mashed, results in a potato product which is more potato-like and preferred from that standpoint. The term "lumps" as employed herein refers to small, discrete pieces of partially cooked potato.

The cooked potatoes may or may not require drying by recirculating hot air or other suitable drying gas but in any event should be in a state whereat the potato texture after mashing is dry and mealy or crumbly in the hand. Some potatoes of low solids content say in the order of 15% or less by weight will require the overt use of a drying means. Other potatoes because of their total solids and the nature thereof do not require the use of a drying step to effect the desired dry texture after the pieces are mashed. In some cases the product may be dried to a solids content as high as 35%. In other cases a product having a solids content as low as 15% prior to mashing may give the desired mealy consistency after mashing. Thus, solids contents of cooked potato pieces lower than 15% may also be practiced in the present steps where such pieces can be effectively shaped after mashing into the desired stick, dice or slice. In general, the solids content of the cooked piece should be such that upon its being mashed it may be extruded to a controllable, uniform shape having a smooth surface conforming to that provided by the shaping means, which means may take the form of an extruder or a shaping die or other suitable apparatus.

By virtue of the mashing which takes place in preparing the potato solids for shaping they are converted to a body of substantial homogeneity such that the pieces shaped will be of substantially uniform sugar level and character throughout and hence will respond uniformly to frying temperatures and frying times and yield a French fried potato product having a uniform color and texture. Thus, potato solids recovered from the interior as well as the peel regions of the potato may be employed together. In cases where the potato solids have a sugar level lower than might be desired for effective browning, the sugar level may be adjusted by simply incorporating sugar into the cook water after blanching or by the addition of a sugar solution to the mash followed by adjustment to a condition suitable for subsequent shaping. Similarly potato solids of one character, say those low in sugar, may be blended in a mashed condition with potato solids of another character to adjust the over-all condition of the mash; thus the chemical constituency of the mash may be tailored to be in a condition more suitable for French frying thereby compensating for crop variations.

According to another embodiment of the present invention, dehydrated mashed potatoes may be employed in place of raw potatoes, in whole or in part, in carrying out the invention. Such dehydrated potato products, typified by dehydrated potato shreds, granules or flakes, all well-known to those skilled-in-the-art and all commercially available, provide many advantages over the use of raw whole potatoes to prepare the products of the present invention. Dehydrated mashed potatoes when reconstituted provide a mash of a controlled moisture content which requires no additional drying and provides a degree of uniformity in the finished product which is unavailable when raw whole potatoes are employed. The dehydrated mashed potato products are eminently suitable for use in the present invention since they are produced primarily during the peak potato season and do not present the storage problems which raw potatoes present. The elimination of such storage problems avoids varying sugar and protein contents in the raw potatoes and in the finished product thus permitting the preparation of a product which is much more stable in color and flavor. Where dehydrated mashed potatoes are employed in the present invention, they may be substituted in part for the mash obtained from raw potatoes. For example, when raw potatoes are known to have a low solids content which would be undesirable, the solids content can be adjusted by the addition of dehydrated mashed potatoes thereby avoiding an additional drying step. The mash prepared from dehydrated mashed potatoes which have been rehydrated is treated in precisely the same manner as is the mash prepared from raw whole potatoes discussed hereinabove.

It is a critical feature of the present invention that the cooked potatoes of the stated solids content, 15–35%, or the potato mash must be cooled to a temperature whereat the mashed potato will retain its form when shaped in a suitable mold or casing. The potato piece or the mash prior to such shaping should be at a temperature substantially above the freezing temperature of water. Otherwise at temperatures below 32° F. the mashed potato solids simply cannot be shaped, except by resorting to such means as sawing or other cutting which is required by reason of the frozen nature of the product. The critical nature of this temperature limitation will be more fully developed in connection with the importance of using cellulose methyl ethers in combination with the mashed potato solids. In general, however, it suffices for the present to state that the temperature of the mashed potato solids prior to shaping is critical not only because of the necessity for shape retention but also because of the product produced upon French frying. For shaped potato solids at temperatures of 70° F. or above, even when the aforementioned methyl cellulose is employed, an undesirable coarse appearance and a poor spongy texture is produced upon French frying and the fried products suffer from excessive fat absorption.

The incorporation of a cellulose methyl ether or any other such colloid, which will gel on heating, allows a skin or containing layer to be formed on the outside of the shaped potato stick or piece during the course of frying such that decomposition of the stick from its shape does not occur during frying. Cooling of the potato shape preserves the intact condition of the article during the early stages of frying until the methyl cellulose has been elevated sufficiently in temperature to serve its skin-forming function. It appears that when the methyl cellulose is present in such a condition as to be adsorbed on the potato solids, though the appearance, texture, and extrudability of the potato mash is not in any observable fashion different from a mash from which the methyl cellulose is absent, the potato piece or shape containing the methyl cellulose will not disintegrate in the course of frying whereas the same piece from which the methyl cellulose is absent will not be sufficiently fat-resistant and the pieces will break up. Thus, it appears that the methyl cellulose is unique in that it combines the function of binding the potato solids together during deep fat frying and is sufficiently fat resistant to result in a French fry of typical appearance, texture and fat content. The condition of the potato mash is such that there is essentially no free water, the water of hydration being substantially imbibed by the potato cells; the methyl cellulose is incorporated under such concentrations as will not change the appearance of such a mash and hence the methyl cellulose will not be employed under conditions such that solutions thereof are identifiable.

The methyl cellulose may be added to the comminuted potato solids as a concentrated solution at any point in the operation after the potatoes are cooked and up to and including the point whereat the comminuted potato solids are chilled to the above-stated temperatures. Preferably the methyl cellulose is added in the form of a powder while the cooked potatoes are being mashed. However, the methyl cellulose may be conveniently added by dusting onto the mash which may then be chilled and extruded or the methyl cellulose may be dusted onto the chilled mash just prior to extrusion.

The level of methyl cellulose used will to some extent depend upon the viscosity of the methyl cellulose. In general the higher the viscosity of the methyl cellulose the lower the level thereof which will be required; likewise, the higher the consistency of the mash, the lower the level of methyl cellulose found necessary. The level and type of methyl cellulose will be to some extent dependent upon the maturity of the potato and the source and condition of the raw potato being treated. In general, however, a level of methyl cellulose should be added sufficient to provide in the shaped potato piece a surface film which will effectively prevent fat up-take during French frying in excess of the desired level while at the same time offering the desired protection of the piece against disintegration during frying. As indicated previously the methyl cellulose may be added as a concentrated solution or conveniently by simple dusting, but in any even will be present in a condition which is substantially indistinguishable from the condition which exists when the methyl cellulose is absent. It appears the colloid will be substantially adsorbed at the surfaces of the potato cells in the shaped piece.

The level of methyl cellulose to be employed will be a very minor part by weight of the potato typically 0.1 to 1.0% and having a viscosity of 10 to 15,000 cps.

The potatoes are preferably shaped by being fed to an extrusion apparatus which typically will comprise a screw operating within a chamber at the discharge end of which a plurality of orifices are provided through which the mash will be forced and compacted, the size and shape of the piece extruded being dependent upon the size and shape of the hole of extrusion orifice. The product thus extruded or otherwise shaped may be described as cohesive with a smooth surface and may contain discrete lumps or pieces of potatoes. Alternatively, the potato mash may be simply passed between a pair of oppositely rotating rolls having corrugations or other similar surfaces therein satisfactorily forcing the mass through openings between the rolls to produce a smooth, elongated strip which may be subsequently cut to the desired shape.

The shaped pieces may be extruded onto a belt and delivered thereby a deep fat fryer or they may be extruded directly into a deep fat fryer. Generally the French frying operation will be carried out at temperatures ranging from 350°–400° F. within a period of 40–120 seconds. The temperature and times for frying are all conventional and well within the skill of those in the art.

The deep fat fried product, which will have a golden color, is thereafter removed from the frying oil and chilled at 0°–70° F. to solidify the fat and prevent clumping of the individual pieces. In general the fat content of the piece produced will range from 6–10%. After chilling the product will be packaged and distributed in a frozen condition.

Dehydrated potato products which may be rehydrated to provide a homogeneous mash free from lumps are suitable for use in the present invention and are typified by dehydrated potato products described in U.S. Patents Nos. 2,780,552, 2,490,431, 2,481,122 and 2,439,119. The commercially available products have been found to be very satisfactory for purposes of this invention.

The invention will now be described more specifically by means of the following examples:

Example 1

Ten pounds of Maine potatoes having an 18% solids content were water blanched for 8 minutes at 212° F. The potatoes were drained and cooled to 70° F. Methyl cellulose at a level of 0.3% by weight of the potato was added to the potatoes. The potatoes and methyl cellulose were mashed through a conventional potato ricer and the homogeneous mass of mashed potato and methyl cellulose was extruded to form elongated strips of potatoes which were cut into the desired length and then deep fat fried at a temperature of 375° F. for about 1 minute. The potatoes were then frozen to 0° F. and stored.

Example 2

Two pounds of commercial dehydrated potato flakes were mixed with methyl cellulose and the potatoes rehydrated to provide a mash having 18% moisture. The methyl cellulose present was at a level of 0.3% by weight of the rehydrated potato mash. The mash was extruded to form elongated strips of potatoes which were then cut into the desired length and then deep fat fried at a temperature of 375° F. for about 1 minute. The potatoes were then frozen to 0° F. and stored.

Example 3

Ten pounds of raw potatoes having a moisture content of 13.5% solids were blanched for 8 minutes at 212° F.; the potatoes were drained and cooled to 70° F. Sufficient commercial dehydrated potatoe flakes were added to provide a moisture content of 18%. Methyl cellulose at a level of 0.3% by weight of the potatoes was added to the potatoes. The potatoes and dehydrated flakes were combined by mashing to provide a uniform homogeneous mash having a solids content of 18%. The mash was extruded into elongated strips which were cut into the desired length and then deep fat fried at a temperature of 375° F. for about 1 minute. The potatoes were then frozen to 0° F. and stored.

The frozen product is adapted to be rapidly heated on a pan or hot plate without thawing and so is adapted to be marketed as a "brown-'n-serve" item. Alternatively, the product is adapted to be further fried to a crisp darker color depending upon individual preference.

While the present invention has been described with particular reference to specific examples, it is not to be limited thereby, but reference is to be had to the appended claims for a definition of its scope.

What is claimed is:

1. A method for making a French fried potato product comprising mixing a cellulose methyl ether at a level of 0.1 to 1% by weight with cooked potatoes, having a solids content in the order of 15–35% adjusting the temperature of said mixture to a temperature below 70° F. but above 32° F., shaping said mixture into pieces having smooth surfaces and French frying such pieces.

2. A method for making a French fried potato product which comprises rehydrating dehydrated mashed potatoes to a solids content of 15–35%, adjusting the temperature of said rehydrated potatoes to a temperature below 70° F. but above 32° F., mixing a cellulose methyl ether at a level of 0.1 to 1% by weight with said rehydrated potatoes, shaping said mixture into pieces having smooth surfaces, and French frying said shaped pieces at an oil temperature of about 350°–400° F. for 40–120 seconds.

3. A method for making a French fried potato product which comprises adding a cellulose methyl ether at a level of 0.1 to 1% by weight and dehydrated potato flakes to cooked potatoes, mixing the cellulose methyl ether, dehydrated potato flakes and cooked potatoes to obtain a homogeneous mash, said mash having a solids content in the order of 15–35%, adjusting the temperature of said mixture to a temperature below 70° F. but above 32° F., shaping said mash into pieces having smooth surfaces and French frying said shaped pieces at an oil temperature of 350°–400° F. for 40–120 seconds.

4. Product of the process of claim 1.

References Cited in the file of this patent

UNITED STATES PATENTS

| | | |
|---|---|---|
| 2,469,995 | Schaul | May 10, 1949 |
| 2,629,665 | Gordon | Feb. 24, 1953 |
| 2,798,814 | Rivoche | July 9, 1957 |
| 2,887,382 | Rivoche | May 19, 1959 |

FOREIGN PATENTS

| | | |
|---|---|---|
| 608,996 | Great Britain | Sept. 23, 1948 |

UNITED STATES PATENT OFFICE
CERTIFICATE OF CORRECTION

Patent No. 3,085,020 — April 9, 1963

George T. Backinger et al.

It is hereby certified that error appears in the above numbered patent requiring correction and that the said Letters Patent should read as corrected below.

Column 5, line 44, for "moisture" read -- solids --; line 58, after "18%" insert -- solids --.

Signed and sealed this 23rd day of June 1964.

(SEAL)
Attest:

ERNEST W. SWIDER
Attesting Officer

EDWARD J. BRENNER
Commissioner of Patents